US008867187B2

(12) United States Patent
Dick et al.

(10) Patent No.: US 8,867,187 B2
(45) Date of Patent: Oct. 21, 2014

(54) APPARATUS FOR POWERING AN ACCESSORY DEVICE IN A REFRIGERATED CONTAINER

(75) Inventors: Paul H. Dick, San Jose, CA (US); Steven Saadat, Fremont, CA (US); Robert Hayes, Palo Alto, CA (US); Michael Weber, Sunnyvale, CA (US); Michael Shannon, Hayward, CA (US)

(73) Assignee: PFI Acquisition, Inc., Menlo Park, CA (US)

( * ) Notice: Subject to any disclaimer, the term of this patent is extended or adjusted under 35 U.S.C. 154(b) by 14 days.

(21) Appl. No.: 13/485,813

(22) Filed: May 31, 2012

(65) Prior Publication Data

US 2012/0309215 A1 Dec. 6, 2012

Related U.S. Application Data

(60) Provisional application No. 61/492,360, filed on Jun. 1, 2011.

(51) Int. Cl.
*H02H 3/027* (2006.01)
*H02J 3/38* (2006.01)

(52) U.S. Cl.
CPC ........................ *H02J 3/38* (2013.01)
USPC ........... 361/111; 439/638; 439/300; 370/501; 370/502; 340/538

(58) Field of Classification Search
USPC ........... 439/638, 300; 361/111, 118; 370/501, 370/502; 340/538
See application file for complete search history.

(56) References Cited

U.S. PATENT DOCUMENTS

| | | |
|---|---|---|
| 2,050,771 A | 8/1936 | Wait |
| 3,417,256 A | 12/1968 | Kadri |
| 3,521,459 A | 7/1970 | Rath |
| 3,719,564 A | 3/1973 | Lilly et al. |
| 3,823,728 A | 7/1974 | Burris |
| 4,002,861 A * | 1/1977 | Putt ................................. 379/21 |
| 4,049,552 A | 9/1977 | Arff |
| 4,211,934 A * | 7/1980 | Henle et al. .................... 307/98 |
| 4,256,770 A | 3/1981 | Rainey |
| 4,579,638 A | 4/1986 | Scherber |

(Continued)

FOREIGN PATENT DOCUMENTS

| | | |
|---|---|---|
| AR | 064678 | 4/2009 |
| CL | 217499 | 6/2000 |

(Continued)

OTHER PUBLICATIONS

Office Action mailed Sep. 3, 2012 in Chile Patent Application No. 3681-2007, filed Dec. 18, 2007.

(Continued)

*Primary Examiner* — Gary Paumen
(74) *Attorney, Agent, or Firm* — Carr & Ferrell LLP

(57) ABSTRACT

Power adapters for providing power to accessory devices in refrigerated containers are provided herein. The power adapter comprises a first connector communicatively coupled with a plurality of conductors; a second connector communicatively coupled with two or more of the plurality of conductors; and a shunt communicatively coupled with at least four of the plurality of conductors and configured to provide power to an accessory output in response to the accessory connection being communicatively coupled with an accessory device.

25 Claims, 8 Drawing Sheets

(56) References Cited

U.S. PATENT DOCUMENTS

| | | | |
|---|---|---|---|
| 4,615,034 A | 9/1986 | von Gunten et al. | |
| 4,704,876 A | 11/1987 | Hill | |
| 4,829,774 A | 5/1989 | Wassibauer et al. | |
| 4,877,588 A | 10/1989 | Ditzler et al. | |
| 4,886,372 A | 12/1989 | Greengrass et al. | |
| 4,890,637 A | 1/1990 | Lamparter | |
| 5,160,606 A | 11/1992 | De Simone et al. | |
| 5,173,257 A | 12/1992 | Pearson | |
| 5,458,899 A | 10/1995 | Floyd et al. | |
| 5,514,345 A | 5/1996 | Garbutt et al. | |
| 5,523,057 A | 6/1996 | Mazzilli | |
| 5,564,225 A | 10/1996 | Quiding et al. | |
| 5,594,740 A | 1/1997 | LaDue | |
| 5,672,406 A | 9/1997 | Challis et al. | |
| 5,741,416 A | 4/1998 | Tempest, Jr. | |
| 5,945,073 A | 8/1999 | Ditzler et al. | |
| 5,989,407 A | 11/1999 | Andrews et al. | |
| 6,013,293 A | 1/2000 | De Moor | |
| 6,019,949 A | 2/2000 | Dunder | |
| 6,031,298 A | 2/2000 | Lo et al. | |
| 6,086,833 A | 7/2000 | Conners et al. | |
| 6,365,026 B1 | 4/2002 | Andrews et al. | |
| 6,367,651 B2 | 4/2002 | Laib et al. | |
| 6,372,096 B1 | 4/2002 | Ditzler | |
| 6,397,612 B1 | 6/2002 | Kernkamp et al. | |
| 6,403,033 B1 | 6/2002 | Gutman | |
| 6,422,884 B1 | 7/2002 | Babasick et al. | |
| 6,502,409 B1 | 1/2003 | Gatling et al. | |
| 6,503,402 B2 | 1/2003 | Jensen | |
| 6,503,547 B1 | 1/2003 | Lima | |
| 6,615,908 B1 | 9/2003 | Bosher et al. | |
| 6,692,489 B1 * | 2/2004 | Heim et al. | 606/34 |
| 6,741,612 B1 * | 5/2004 | Butler et al. | 370/501 |
| 6,747,859 B2 * | 6/2004 | Walbeck et al. | 361/93.1 |
| 6,817,541 B2 | 11/2004 | Sands et al. | |
| 6,866,527 B2 | 3/2005 | Potega | |
| 6,909,907 B1 * | 6/2005 | Oyang et al. | 455/556.1 |
| 6,942,834 B2 | 9/2005 | Gutman | |
| 7,026,929 B1 | 4/2006 | Wallace | |
| 7,101,226 B1 * | 9/2006 | Gilliland | 439/620.01 |
| 7,151,950 B1 * | 12/2006 | Oyang et al. | 455/556.1 |
| 7,230,811 B2 * | 6/2007 | Walbeck et al. | 361/93.1 |
| 7,573,159 B1 * | 8/2009 | Deluliis et al. | 307/150 |
| 7,813,501 B2 * | 10/2010 | Thomson et al. | 379/413.04 |
| 7,835,885 B2 | 11/2010 | Ben-Tzur et al. | |
| 8,067,895 B1 * | 11/2011 | Lee | 315/241 R |
| 8,222,773 B2 * | 7/2012 | De Iuliis et al. | 307/151 |
| 8,258,940 B2 * | 9/2012 | Matsuda et al. | 340/538 |
| 8,410,632 B2 * | 4/2013 | Chou et al. | 307/17 |
| 8,536,737 B2 * | 9/2013 | Azancot et al. | 307/104 |
| 2002/0027109 A1 | 3/2002 | Conrad et al. | |
| 2002/0117458 A1 | 8/2002 | Puetter et al. | |
| 2003/0024863 A1 | 2/2003 | Gannon et al. | |
| 2003/0146394 A1 | 8/2003 | Prange et al. | |
| 2003/0185948 A1 | 10/2003 | Garwood | |
| 2003/0198716 A1 | 10/2003 | Hankinson et al. | |
| 2003/0203980 A1 | 10/2003 | Valdes | |
| 2004/0028925 A1 | 2/2004 | Kusume et al. | |
| 2004/0060305 A1 | 4/2004 | Singh et al. | |
| 2004/0262241 A1 | 12/2004 | Socha | |
| 2004/0265197 A1 | 12/2004 | Lin | |
| 2005/0029080 A1 | 2/2005 | Rupp | |
| 2005/0063535 A1 * | 3/2005 | Walbeck et al. | 379/399.01 |
| 2005/0123436 A1 | 6/2005 | Cumberland | |
| 2005/0193820 A1 | 9/2005 | Sheljaskow et al. | |
| 2005/0238776 A1 | 10/2005 | Cheung et al. | |
| 2005/0284745 A1 | 12/2005 | Smith | |
| 2006/0130498 A1 | 6/2006 | Joshi et al. | |
| 2006/0251551 A1 | 11/2006 | Johnson | |
| 2006/0276970 A1 | 12/2006 | Barnes et al. | |
| 2007/0036171 A1 * | 2/2007 | Magin | 370/463 |
| 2007/0077819 A1 * | 4/2007 | Thomson et al. | 439/620.01 |
| 2007/0131671 A1 | 6/2007 | Timans et al. | |
| 2007/0291433 A1 * | 12/2007 | Ziegler et al. | 361/93.1 |
| 2008/0062606 A1 * | 3/2008 | Brown et al. | 361/111 |
| 2008/0116149 A1 | 5/2008 | Dick et al. | |
| 2008/0159910 A1 | 7/2008 | Dick et al. | |
| 2008/0166458 A1 | 7/2008 | Weber et al. | |
| 2008/0166694 A1 | 7/2008 | Weber et al. | |
| 2009/0185959 A1 | 7/2009 | Weber et al. | |
| 2009/0191735 A1 * | 7/2009 | Lin | 439/131 |
| 2009/0303052 A1 | 12/2009 | Aklepi et al. | |
| 2010/0061028 A1 * | 3/2010 | Lestician | 361/111 |
| 2011/0029413 A1 | 2/2011 | Ben-Tzur et al. | |
| 2011/0077909 A1 | 3/2011 | Gregory et al. | |
| 2011/0254461 A1 * | 10/2011 | Summerland et al. | 315/291 |
| 2012/0139511 A1 * | 6/2012 | Chou et al. | 323/267 |
| 2012/0275206 A1 * | 11/2012 | Deiuliis et al. | 363/146 |
| 2012/0300505 A1 * | 11/2012 | Chueh et al. | 363/21.09 |
| 2013/0036068 A1 | 2/2013 | Smith et al. | |

FOREIGN PATENT DOCUMENTS

| | | |
|---|---|---|
| CL | 353208 | 2/2010 |
| CN | 1146240 A | 3/1997 |
| CN | 2680614 Y | 2/2005 |
| CN | 101626826 A | 1/2010 |
| CN | 200780051914.9 | 3/2013 |
| EP | 2107936 | 10/2009 |
| EP | 2240270 | 10/2010 |
| JP | 04311345 | 11/1992 |
| JP | 2004053160 | 2/2004 |
| NL | 2107936 | 8/2012 |
| TR | 201211329 T4 | 8/2012 |
| TW | 200841928 | 11/2008 |
| TW | 200936062 | 9/2009 |
| TW | I434730 | 4/2014 |
| WO | WO02074349 | 9/2002 |
| WO | WO2004066758 | 8/2004 |
| WO | WO2008045390 | 4/2008 |
| WO | WO2008082452 | 7/2008 |
| WO | WO2008085230 | 7/2008 |
| WO | WO2008085231 | 7/2008 |
| WO | WO2009070323 | 6/2009 |
| WO | WO2012166984 | 12/2012 |
| WO | WO2013022794 | 2/2013 |

OTHER PUBLICATIONS

Office Action mailed Jan. 10, 2012 in Chile Patent Application No. 3681-2007, filed Dec. 18, 2007.

Office Action mailed Jan. 5, 2012 in Chinese Patent Application No. 200780051914.9, filed Nov. 16, 2007.

Office Action mailed May 20, 2013 in Taiwan Patent Application No. 096148121, filed Dec. 14, 2007.

MPACT RCF, "Refrigerated Container Ozone Fumigation System," Sep. 17, 2006, <https://web.archive.org/web/20060917140438/http://www.amfiltech.com/>.

AIROCARE, "Perishable Product Transportation," May 16, 2006, <https://web.archive.org/web/20060516122447/http://.www.airocare.com/app/perishable.html>.

Pal, Amit, Shelf Life Evaluation of Ready-to-Eat Meat and Poultry Products Based on *Listeria* Monocytogenes Growth, University of Minnesota, Dec. 2007, pp. first pages, i-xi, and 1-60 (clip of full reference due to length of reference).

"Amador, Cecilia R., Development of Radio Frequency Identification (RFID) Temperature Tracking Systems for Food SupplyChains, University of Florida, 2010, pp. first pages, 1-21, and 133-165 (clip of full reference due to length of reference)".

International Search Report and Written Opinion of the International Searching Authority mailed Oct. 18, 2012 in Patent Cooperation Treaty Application No. PCT/US2012/049639, filed Aug. 3, 2012.

International Search Report and Written Opinion of the International Searching Authority mailed Aug. 31, 2012 in Patent Cooperation Treaty Application No. PCT/US2012/040306, filed May 31, 2012.

United States Department of Agriculture (USDA), Protecting Perishable Foods During Transport by Truck, Handbook No. 669, Sep. 1995, Reprinted Jul. 2006.

Postharvest Technology of Horticultural Crops, Publication 3311, Third Edition, Adel A. Kader, Technical Editor, 2002.

(56) References Cited

OTHER PUBLICATIONS

International Search Report and Written Opinion of the International Searching Authority mailed Apr. 3, 2008 in Patent Cooperation Treaty Application No. PCT/US2007/024102, filed Nov. 16, 2007.
Artes. Refrigeration for Preserving the Quality and Enhancing the Safety of Plant Food. Bulletin of the IIR. 2004, No. 2004-1.
International Search Report and Written Opinion of the International Searching Authority mailed Mar. 13, 2008 in Patent Cooperation Treaty Application No. PCT/US2007/021501, filed Oct. 5, 2007.
International Search Report and Written Opinion of the International Searching Authority mailed Mar. 25, 2008 in Patent Cooperation Treaty Application No. PCT/US2007/024156, filed Nov. 16, 2007.
International Search Report and Written Opinion of the International Searching Authority mailed Apr. 22, 2008 in Patent Cooperation Treaty Application No. PCT/US2007/024052, filed Nov. 16, 2007.
International Search Report and Written Opinion of the International Searching Authority mailed Feb. 5, 2009 in Patent Cooperation Treaty Application No. PCT/US2008/013187, filed Nov. 25, 2008.
BreatheWay Difference, Jun. 18, 2007, <https://web.archive.org/web/20070618200501/http://www.breatheway.com/overview/difference.aspx>.
Notice of Allowance mailed Feb. 20, 2014 in Taiwanese Application No. 096148121, filed Dec. 14, 2007.

* cited by examiner

APPARATUS FOR POWERING AN ACCESSORY DEVICE IN A REFRIGERATED CONTAINER

CROSS REFERENCE TO RELATED APPLICATIONS

This application claims the benefit of U.S. Provisional Application No. 61/492,360 filed on Jun. 1, 2011 entitled "Method and Apparatus for Installing and Powering an Accessory Device in a Refrigerated Container." The disclosure of the aforementioned application is incorporated herein by reference in its entirety.

FIELD OF TECHNOLOGY

Embodiments of the disclosure relate to providing power in shipping containers, and more specifically to providing power to accessory devices in environmentally-controlled shipping containers.

BACKGROUND OF THE DISCLOSURE

Perishable agricultural products such as harvested fruits, vegetables, and flowers, as well as frozen foods, are typically transported in refrigerated shipping containers. These containers are designed for transport by truck, rail, air, or ship, enabling consumers to enjoy a wide variety of products year-round from many parts of the world.

Refrigeration itself is an effective means of preserving the freshness of agricultural products for extended periods of time and of inhibiting spoilage and the growth of microorganisms. However, refrigeration only retards the growth of these microorganisms and does not destroy them, and as much as 20% of all products shipped worldwide are lost to spoilage and rot. Further, certain fresh products emit ethylene, which promotes undesired ripening of the products during transport.

Refrigerated containers may include fans which operate at a low speed and a high speed. However, electrical infrastructure which may be used to power accessory devices within the refrigerated container is not provided in the current art. Furthermore, refrigerated containers in the current art do not provide structural infrastructure to accommodate (e.g., mount) accessory devices. Modification of the interior of a refrigerated container and installation/removal of accessory devices would require additional materials and significant time. Such accessory devices may significantly contribute to preserving the freshness and safety of agricultural products.

SUMMARY OF THE DISCLOSURE

According to some embodiments, the present technology may be directed to apparatus for providing power to accessory devices in refrigerated containers. The apparatus may comprise: a first connector communicatively coupled with a plurality of conductors; a second connector communicatively coupled with two or more of the plurality of conductors; and a shunt communicatively coupled with at least four of the plurality of conductors and configured to provide power to an accessory output in response to the accessory connection being communicatively coupled with an accessory device.

According to other embodiments, the apparatus may comprise: a first connector communicatively coupled with a plurality of conductors; a second connector communicatively coupled with two or more of the plurality of conductors; and a shunt communicatively coupled with at least four of the plurality of conductors and configured to provide power to an accessory output in response to the accessory connection being communicatively coupled with an accessory device. The shunt may include: a protection circuit, the protection circuit configured to provide at least one of protection from overcurrents and protection from excessive transient voltages at a first, a second, a third, and a fourth inputs, the first, the second, the third, and the fourth inputs each communicatively coupled with the at least four conductors of the plurality of conductors, an inductive coupler including: a first transformer having a primary coil communicatively coupled with the first input and the second input, and a second transformer having a primary coil communicatively coupled with the third input and the fourth input, a main rectifier including: a first rectifier communicatively coupled with the first input, the second input, a first node, and a second node; and a second rectifier communicatively coupled with the third input, the fourth input, the first node, and the second node, and a failsafe including: a first output, the first output being communicatively coupled with a first conductor of the accessory output; a first switch communicatively coupled with the first node and the first output; a first power supply including a first secondary coil of the first transformer and a third rectifier, a first secondary coil of the second transformer and a fourth rectifier communicatively coupled with the first switch; a first opto-isolator communicatively coupled with the first output and the first switch; a second output, the second output communicatively coupled with a second conductor of the accessory output; a second switch communicatively coupled with the second node and the second output; a second power supply including a second secondary coil of the first transformer and a fifth rectifier, a second secondary coil of the second transformer and a sixth rectifier communicatively coupled with the second switch; and a second opto-isolator communicatively coupled with the second output and the second switch; a loop input, the loop input communicatively coupled with a third conductor of the accessory output and the second opto-isolator, the second opto-isolator communicatively coupled with the first opto-isolator; a loop output, the loop output communicatively coupled with the first opto-isolator, a third power supply, and a fourth conductor of the accessory output; and a third power supply including a third secondary coil of the first transformer and a seventh rectifier, a third secondary coil of the second transformer and an eighth rectifier communicatively coupled with the loop output.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

In the following description, for purposes of explanation, numerous specific details are set forth in order to provide a thorough understanding of the disclosure. It will be apparent, however, to one skilled in the art, that the disclosure may be practiced without these specific details. In other instances, structures, and devices are shown in block diagram form only to in order to avoid obscuring the disclosure.

Figure 1:
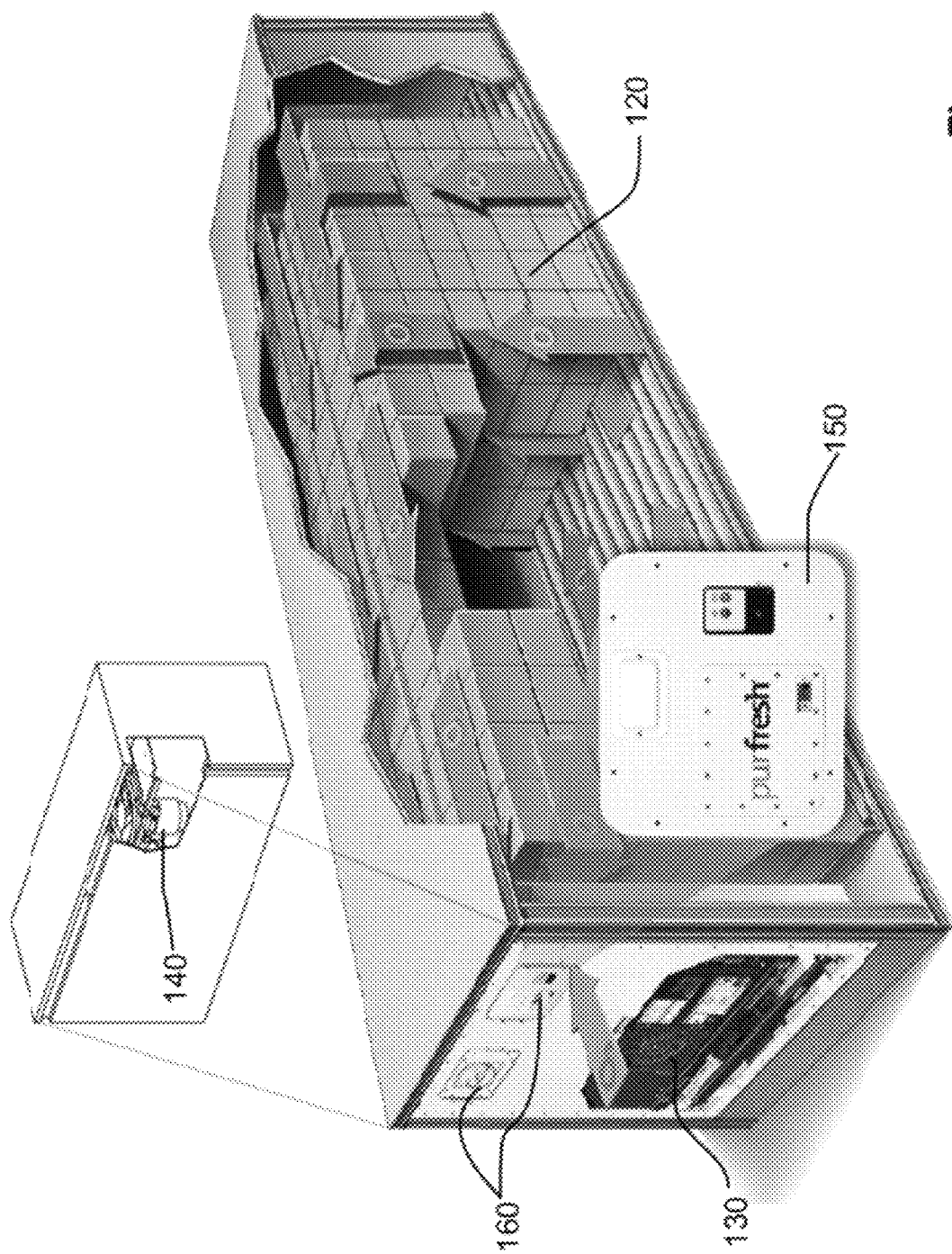
FIG. 1 illustrates an intermodal container.

FIG. 1 illustrates an intermodal container 110 according to embodiments of the present invention. Intermodal container 110 may be a standardized reusable steel box used for the safe, efficient, and secure storage and movement of materials and products within a global containerized intermodal freight transport system. Intermodal container 110 may be moved from one mode of transport (e.g., ship, rail, truck, airplane, etc.) to another without unloading and reloading the contents of intermodal container 110. Intermodal container 110 may be, for example, 8 feet to 56 feet long and 8 feet to 9.5 feet high. Intermodal container 110 may be also be referred to as a refrigerated container, reefer, container, freight container, ISO container, shipping container, ocean cargo container, hi-cube container, box, conex box, and sea can.

Intermodal container 110 may contain perishable goods 120 such as agricultural or medical products. Agricultural products may include harvested fruits, vegetables, flowers, meats, frozen foods, and the like. Medical products may include blood plasma, insulin, and the like. Intermodal container 110 may include refrigeration unit 130. Refrigeration unit 130 maintains a temperature inside intermodal container 110 below a predefined limit or limits. The predefined limits may be selected, for example, to optimally preserve the freshness—of the type or kind of perishable goods 120 inside intermodal container 110—for extended periods of time and to inhibit spoilage and the growth of microorganisms.

Refrigeration unit 130 may include fans 140 which may force air through coils (not shown in FIG. 1) of refrigeration unit 130 and circulate air around and through perishable goods 120. Fans 140 may receive air from outside of intermodal container 110 via openings within access panel 160 and may operate at one or more speeds using single or multiple phases of power. Embodiments of fans 140 may, for example, operate at two speeds (i.e., high speed and low speed). Although one of fans 140 is shown in FIG. 1, refrigeration unit 130 may include two or more of fans 140. In some embodiments, refrigeration unit 130 includes three of fans 140.

As shown in FIG. 1, accessory device or panel 150 may be disposed in an access panel 160 of intermodal container 110. Access panel 160 may be an opening in a wall or ceiling (e.g. fan cover) of intermodal container 110 that may allow access from the exterior to the interior of intermodal container 110.

Accessory device 150 may include one or more apparatus for preserving, monitoring, logging, communicating/reporting, and controlling the state of intermodal container 110. Accessory device 150 may contribute to the preservation and safety of perishable goods 120, for example, by injecting ozone, reducing an oxygen concentration, increasing a CO2 concentration, reducing an ethylene concentration, controlling humidity, adjusting a fresh air vent, filtering fluids, monitoring/receiving sensor data, storing/recording/logging sensor data, and reporting sensor data, and the like inside of intermodal container 110. Sensor data may, for example, include: state (e.g., error, warning, message, interrupt, diagnostic code, event, condition, etc.) of a controller in intermodal container 110 (e.g., of refrigeration unit 130), container position (e.g., via a Global Positioning System (GPS) navigation device, satellite radio, and a GSM modem), O3 concentration, CO2 concentration, O2 concentration, CO concentration, C2H4 concentration, temperature, relative humidity, vibration, mechanical shock, opening/closing of access door(s), power status, and the like. Accessory device 150 may, for example, include: an ozonation system, membrane-based gas separation systems, pressure-swing absorption (PSA) devices, compressors, condensation traps, chillers, evaporators, atomizers, air cleaners based at least in part on electrical fields, scrubbers, catalytic reactors, and the like.

Figure 2:
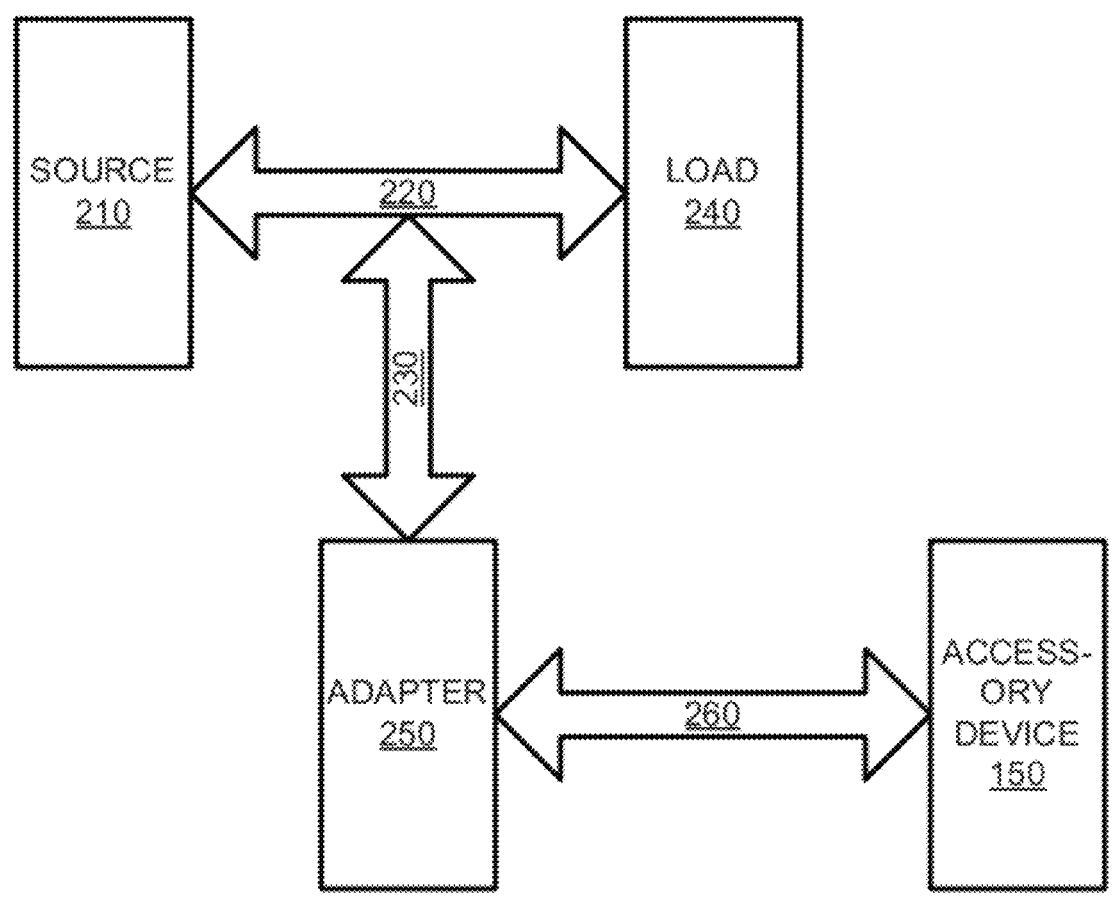
FIG. 2 is a block diagram of a system.

FIG. 2 illustrates a system 200 according to embodiments of the present invention. System 200 includes a source 210, load 240, adapter 250, and accessory device 150. Source 210, load 240, and adapter 250 are communicatively coupled with each other via interconnects 220 and 230. Adapter 250 is communicatively coupled with accessory device 150 via interconnect 260.

Source 210 is a power source which provides two or more phases of the power used, for example, to operate intermodal container 110 when it is at sea on a container ship, on quay, at a land-based site, transported over road and/or rail, and the like. Source 210 may include a power station, solar cell array, generator, wind turbine, (rechargeable) battery, fuel cell, and the like. In some embodiments, source 210 is a diesel generator. In some embodiments, source 210 provides at least one of 360-460 Volts alternating current (AC) at 50 Hz and 400-500 Volts AC at 60 Hz. Load 240 is an electrical load which may operate using power from source 210. Embodiments of load 240 include one or more fans.

Adapter 250 may receive power from source 210 and provide conditioned power to accessory device 150. Adapter 250 may, for example, convert the power received from source 210 to a higher or/or lower voltage, convert AC to AC voltage (e.g., frequency change), convert AC to direct current (DC) voltage, provide protection from overcurrents and transient voltages. Adapter 250 may, for example, further condition power to correct for such conditions as swell (i.e., when the RMS voltage exceeds the nominal voltage by 10 to 80% for 0.5 cycle to 1 minute), sag (i.e., the RMS voltage is below the nominal voltage by 10 to 90% for 0.5 cycle to 1 minute), undervoltage (i.e., when the nominal voltage drops below 90% for more than 1 minute), overvoltage (i.e., when the nominal voltage rises above 110% for more than 1 minute), variations in the frequency, harmonics (i.e., variations in the wave shape), and the like. In some embodiments, adapter 250 may provide 1-500 Volts DC to accessory device 150.

Interconnects 220, 230, and 260 may each be comprised of two or more electrical conductors. Conductors may be solid or stranded copper wire covered with insulating materials, such as plastic, rubber-like polymers, or varnish. Interconnect 220 may include one or more conductors that communicatively couple source 210 with load 240 and with interconnect 230. Other combinations of connectivity between source 210, load 240 and interconnect 230 may be used. Interconnect 220 may, for example, also include one or more conductors which may communicatively couple source 210 with load 240 without communicatively coupling with interconnect 230. Such conductors may, for example, carry signals for controlling power to load 240, for detecting fault conditions such as opens, shorts, or over-temperature conditions, and the like.

Figure 3:
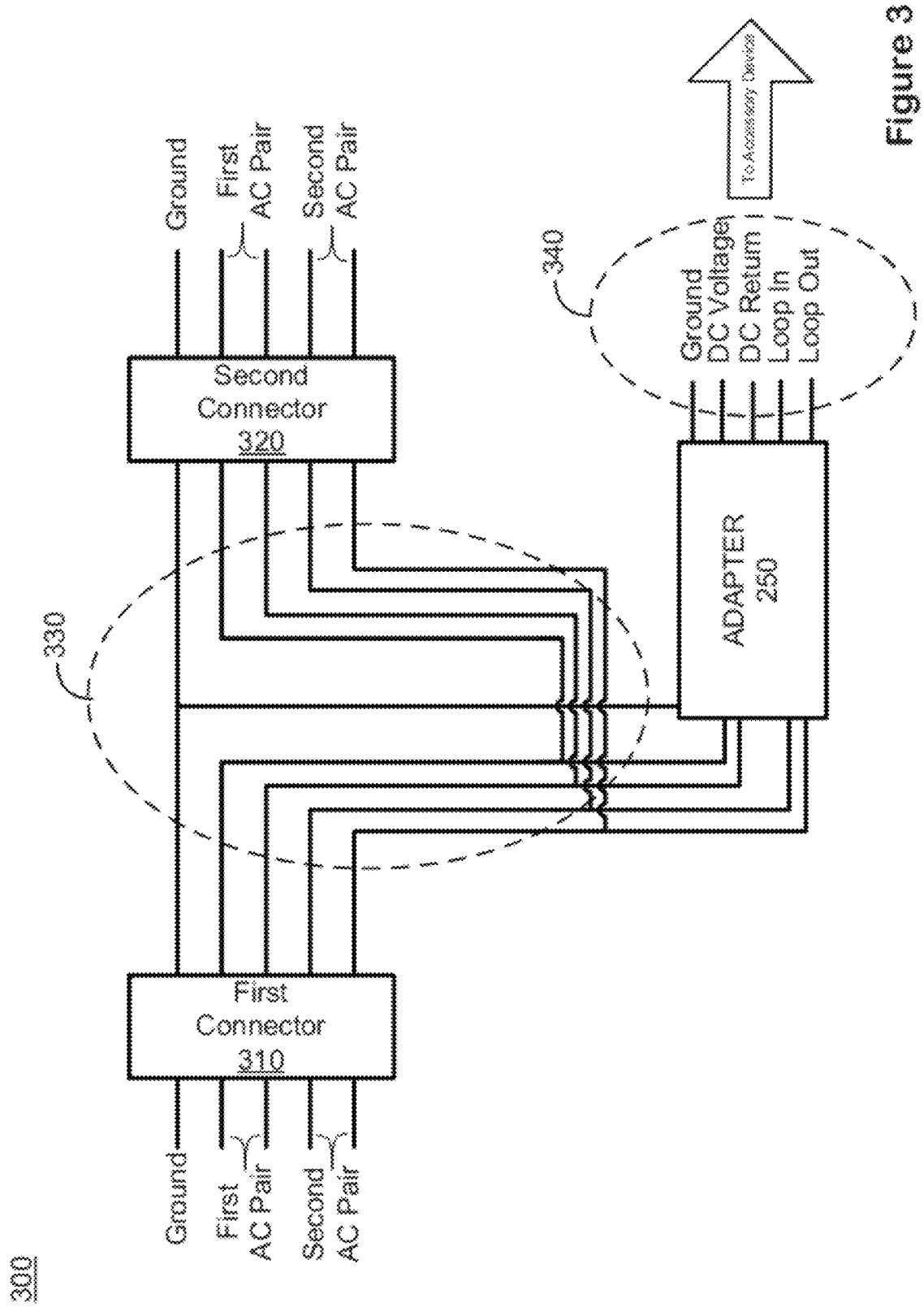
FIG. 3 is a block diagram of an assembly.

FIG. 3 illustrates assembly 300, which includes adapter 250 and interconnects 220, 230, and 260. Assembly 300 may communicatively couple with source 210 through first connector 310 and with load 240 through second connector 320. First connector 310 and second connector 320 may be electro-mechanical devices for joining electrical circuits using a mechanical assembly. In some embodiments, first connector 310 and second connector 320 may each be plug or socket connectors. Plug and socket connectors are comprised of a male plug (e.g., pin contacts) and a female receptacle (e.g., socket contacts). Male plugs may have one or more pins or prongs that are inserted into openings in the female receptacle.

In further embodiments, first connector 310 may couple with source 210 and second connector 320 may couple with load 240 through crimp connections. Crimp connections may comprise a metal piece in the shape of a barrel, "U," or "V," and an insulator. Conductors to be coupled may be placed in (or on) the barrel (or "U" or "V") shaped metal piece. The metal piece is mechanically deformed/compressed (i.e., crimped) tightly around the conductor. The crimp connections may be coated or covered with electrical grease to prevent corrosion. Other electrical connections, such as soldering, terminal blocks, binding posts, and the like may be additionally or alternatively used.

As shown in FIG. 3, in some embodiments some of conductors 330 may pass through from first connector 310 to second connector 320. In further embodiments, others of conductors 330 may go from first connector 310 to adapter 250 to second connector 320. Additional electrically equivalent configurations of conductors 330 may also be used. Output 340 of adapter 250 may couple with accessory device 150 through a connector and/or other electrical connections, as described above for first connector 310 and second connector 320. In some embodiments, output 340 includes a ground, DC voltage, DC return, loop in, and loop out.

Figure 4:
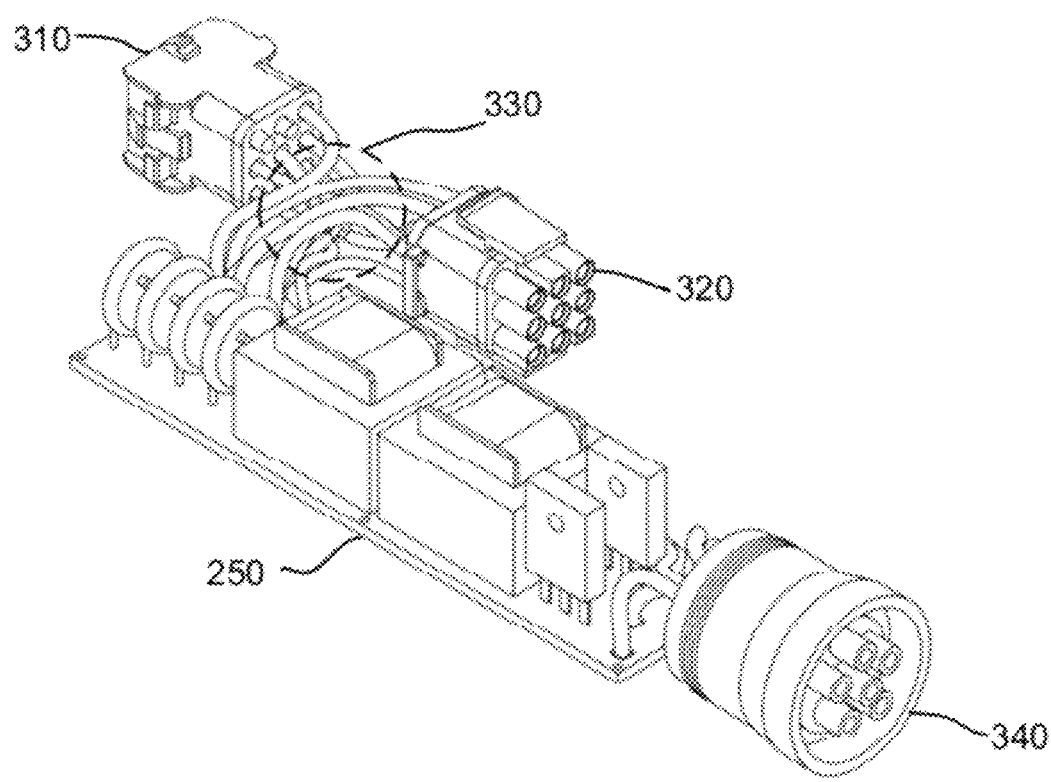
FIG. 4 illustrates some embodiments of an adaptor.

FIG. 4 illustrates an embodiment of assembly 300 according to embodiments of the present invention. In the embodiment of FIG. 3, first connector 310 is a 9-pin female square/rectangular connector, second connector 320 is a 9-pin male square/rectangular connector, output 340 of adapter 250 is a 6-pin female round connector, and conductors 330 are insulated wires. Other connectors having a different number of pins and/or physical characteristics (e.g., dimensions and shapes) may be used. In further embodiments, first connector 310 and second connector 320 are 12-pin connectors.

Figure 5:
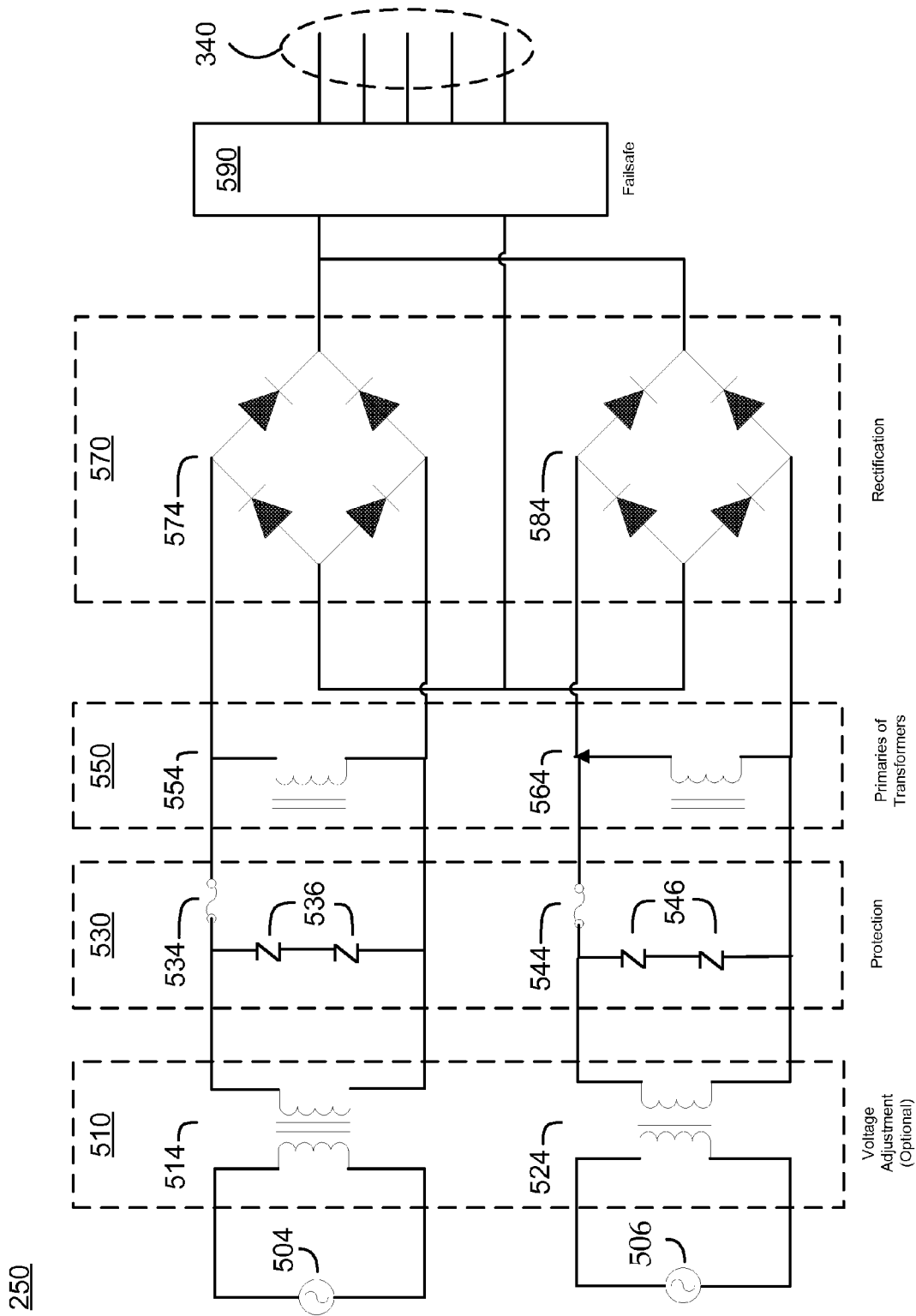
FIG. 5 is a schematic representation of an adaptor.

FIG. 5 illustrates an embodiment of adapter 250 according to some embodiments of the present invention. Adapter 250 may also optionally include voltage adjustment 510 and/or protection 530 (also referred to herein as protection circuit 530). Adapter 250 may also include primaries of transformers 550, rectification 570, and failsafe 590. Adapter 250 may receive AC voltage inputs 504 and 506, for example, from source 210 through first connector 310 and conductors 330. Adapter 250 may provide outputs 340.

Voltage adjustment 510 may inductively couple AC voltage inputs 504 and 506 to the rest of adapter 250 (i.e., protection 530, primaries of transformers 550, rectification 570, failsafe 590, and outputs 340). Voltage adjustment 510 may also increase and/or decrease the voltage received from AC voltage inputs 504 and 506. Voltage adjustment 510 may include transformers 514 and 524. In some embodiments, transformers 514 and 524 receive 360-460 Volts AC at 50 Hz and/or 400-500 Volts AC at 60 Hz and provide 1-500 Volts AC.

Protection circuit 530 may provide protection from overcurrents and excessive transient voltages. Protection 530 may, for example, include one or more of circuit breakers, fuses, and varistors. Circuit breakers are automatically operated electrical switches designed to protect an electrical circuit from damage caused by overload or short circuit by detecting a fault condition and interrupting continuity to discontinue electrical flow. Circuit breakers may be reset to place the electrical circuit back into operation. Fuses perform a similar function as fuses, however fuses are sacrificial devices (i.e., are blown when a fault condition occurs) and must be replaced to place the electrical circuit back into operation. Varistors may protect electrical circuits against excessive transient voltages by (when triggered) shunting the current created by the high voltage away from the electrical circuit. Embodiments of protection circuit 530 include fuses 534 and 544 and metal-oxide varistors (MOVs) 536 and 546.

Primaries of transformers 550 are the primary coils of transformers used to inductively couple components of failsafe 590 to AC voltage inputs 504 and 506, and provide power to failsafe 590. In some embodiments, primaries of transformers 550 include primaries of transformers 554 and 564. The primary coils in conjunction with the secondary coils (described later in relation to FIG. 6) comprise complete transformers.

Rectification 570 converts AC to DC. Rectification 570 may include half-wave, full-wave, and voltage-multiplier rectifiers. Rectification 570 may also include a filter (or smoothing) circuit (e.g., capacitor) to provide a steady DC voltage. Some embodiments of rectifier 570 include diode bridges 574 and 584.

Failsafe 590 may prevent adapter 250 from supplying power to outputs 340 when adapter 250 is not communicatively coupled to accessory device 150. In various embodiments, failsafe 590 operates as a switch which closes in response to outputs 340 being communicatively coupled with accessory device 150 and opens in response to outputs 340 being communicatively uncoupled from accessory device 150. In this way, dangerous exposure to high voltage and the resulting risk of electrical shock and fire may be advantageously prevented by failsafe 590. In some embodiments, outputs 340 may include 1-500 Volts DC.

Figure 6:
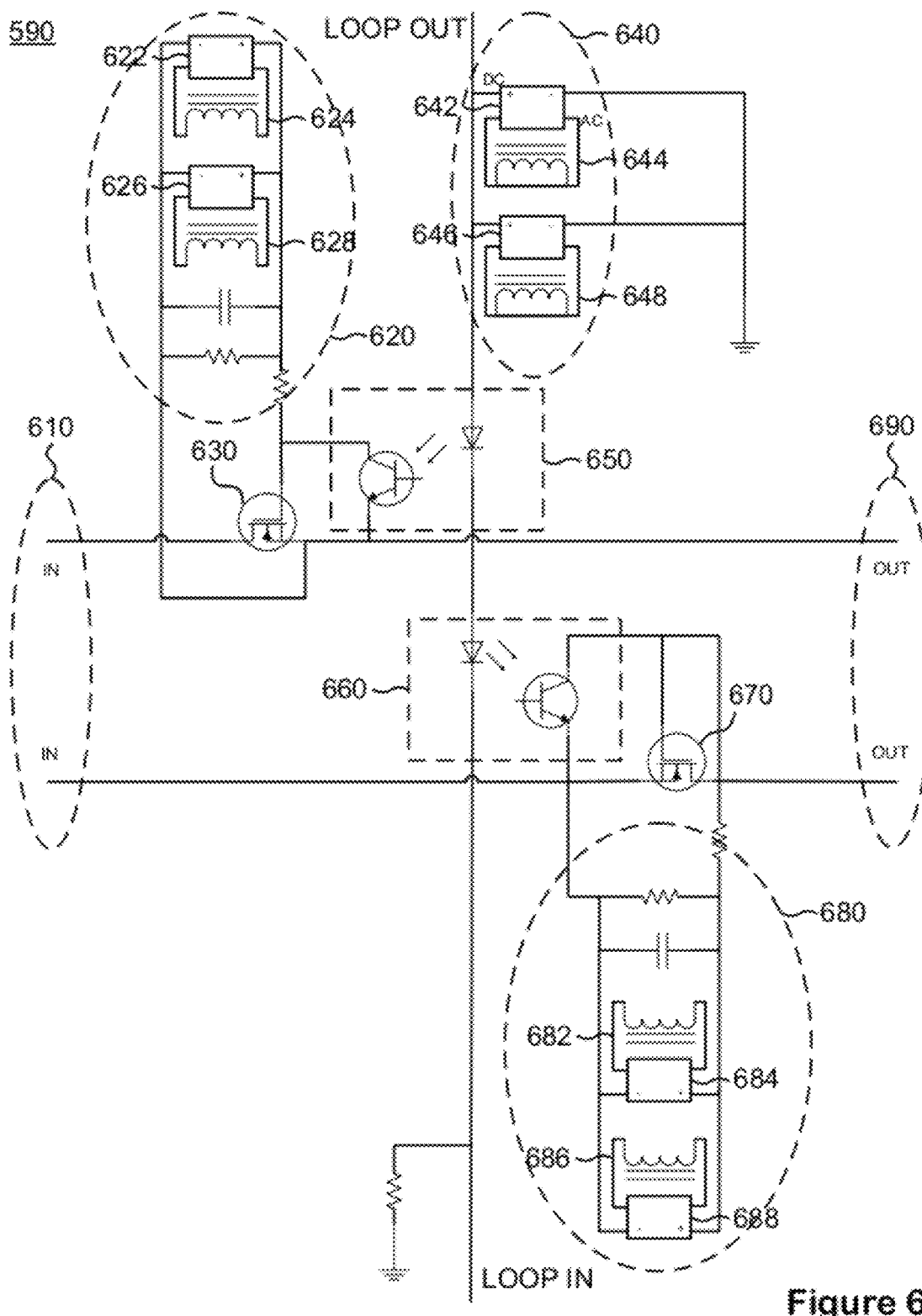
FIG. 6 is a schematic representation of a failsafe.

FIG. 6 illustrates an embodiment of failsafe 590 in accordance with various embodiments of the present invention. Failsafe 590 may include inputs 610 communicatively coupled with outputs 690 through switches 630 and 670. Inputs 610 may be communicatively coupled with diode bridges 574 and 584. Switches 630 and 670 may be communicatively coupled with first power supply 620 and opto-coupler 650, and second power supply 680 and opto coupler 660, respectively. Failsafe 590 may also include LOOP IN communicatively coupled with LOOP OUT through opto-couplers 650 and 660. LOOP OUT is communicatively coupled with third power supply 640.

Switch 630 and switch 670 may receive DC power from first power supply 620 and second power supply 680, respectively. Opto-couplers 650 and 660 (also referred to as opto-isolators, photocouplers, and optical isolators) may be devices which transfer electrical signals by utilizing light waves to provide coupling with electrical isolation between its input and output. Switches 630 and 670 may, for example be electrically operated switches, such as transistors, relays, and the like. In some embodiments, switches 630 and 670 may be n-channel field effect transistors (e.g., JFET and MOSFET).

First power supply 620 may, for example, include rectifier 622, secondary coil 624 of transformer 554, rectifier 626, and secondary coil 628 of transformer 564. Rectifiers 622 and 626 may be half-wave, full-wave, and voltage-multiplier rectifiers. First power supply 620 may also include a filter (or smoothing) circuit (e.g., capacitor) to provide a steady DC voltage. In some embodiments, first power supply 620 may provide 15 Volts DC.

Second power supply 680 may, for example, include rectifier 684, secondary coil 682 of transformer 554, rectifier 688, and secondary coil 686 of transformer 564. Rectifiers 684 and 688 may be half-wave, full-wave, and voltage-multiplier rectifiers. Second power supply 680 may also include a filter (or smoothing) circuit (e.g., capacitor) to provide a steady DC voltage. In some embodiments, second power supply 680 may provide 15 Volts DC.

Third power supply 640 may, for example, include rectifier 642, secondary coil 644 of transformer 554, rectifier 646, and secondary coil 648 of transformer 564. Rectifiers 642 and 646 may be half-wave, full-wave, and voltage-multiplier rectifiers. Third power supply 640 may also include a filter (or smoothing) circuit (e.g., capacitor) to provide a steady DC voltage. In some embodiments, third power supply 640 may provide 15 Volts DC.

In response to LOOP IN and LOOP OUT being communicatively uncoupled with each other (i.e., open), third power supply 640 may provide an electrical potential (i.e., voltage) across LOOP IN and LOOP OUT, and the light sources inside opto-couplers 650 and 660 may provide light. In response to the light sources inside opto-couplers 650 and 660 providing light, sensors inside opto-couplers 650 and 660 may provide (or modulate) electric current flow. The flow of current through sensors inside opto-couplers 650 and 660 may open switches 630 and 670. When switches 630 and 670 are open, adapter 250 may not provide power to outputs 340.

In response to LOOP IN and LOOP OUT being communicatively coupled with each other (i.e., shorted), third power supply 640 may be effectively tied to ground and there may not be a substantial electrical potential (i.e., voltage) across LOOP IN and LOOP OUT, and the light sources inside opto-couplers 650 and 660 may not provide light. In response to the light sources inside opto-couplers 650 and 660 not providing light, sensors inside opto-couplers 650 and 660 may not provide (or modulate) electric current flow. The lack of current flow through sensors inside opto-couplers 650 and 660 may close switches 630 and 670. When switches 630 and 670 are closed, adapter 250 provides power to outputs 340.

Figure 7:
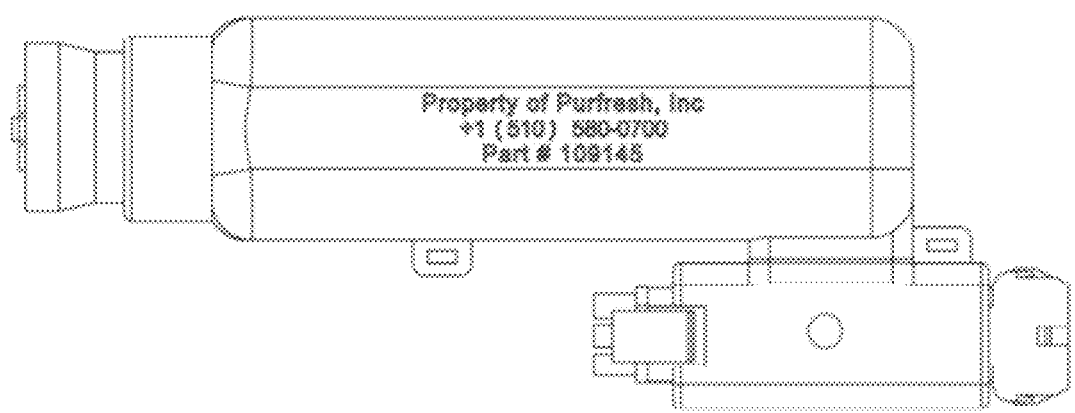
FIG. 7 illustrates assorted embodiments of an enclosure.

FIG. 7 illustrates enclosure 700 according to some embodiments of the present invention. Enclosure 700 is optional, and may enclose adapter 250. In some embodiments, adapter 250 is encapsulated in enclosure 700. Enclosure 700 may protect adapter 250 from electrical shorts, shock, vibration, moisture, and corrosion. Enclosure 700 may, for example, comprise solid or gelatinous thermo-setting plastic and silicon rubber gels, such as polycarbonate resin thermoplastic, thermoplastic elastomer, polyurethane, silicone, epoxy resin, and other encapsulation materials. In some embodiments, enclosure 700 comprises polycarbonate resin thermoplastic and thermoplastic elastomer.

Enclosure 700 may be mounted outside of or within intermodal container 110. Enclosure 700, for example, may be coupled to an interior floor, wall, and/or ceiling of intermodal container 110. In various embodiments, enclosure 700 (or adapter 250 without enclosure 700) is disposed on or adjacent to fan 140. In further embodiments, enclosure 700 (or adapter 250 without enclosure 700) is mounted adjacent to or within accessory device 150. In these ways, enclosure 700 (or adapter 250 without enclosure 700) may be quickly installed without additional hardware and may be removed when accessory device 150 is removed from intermodal container 110.

Figure 8:
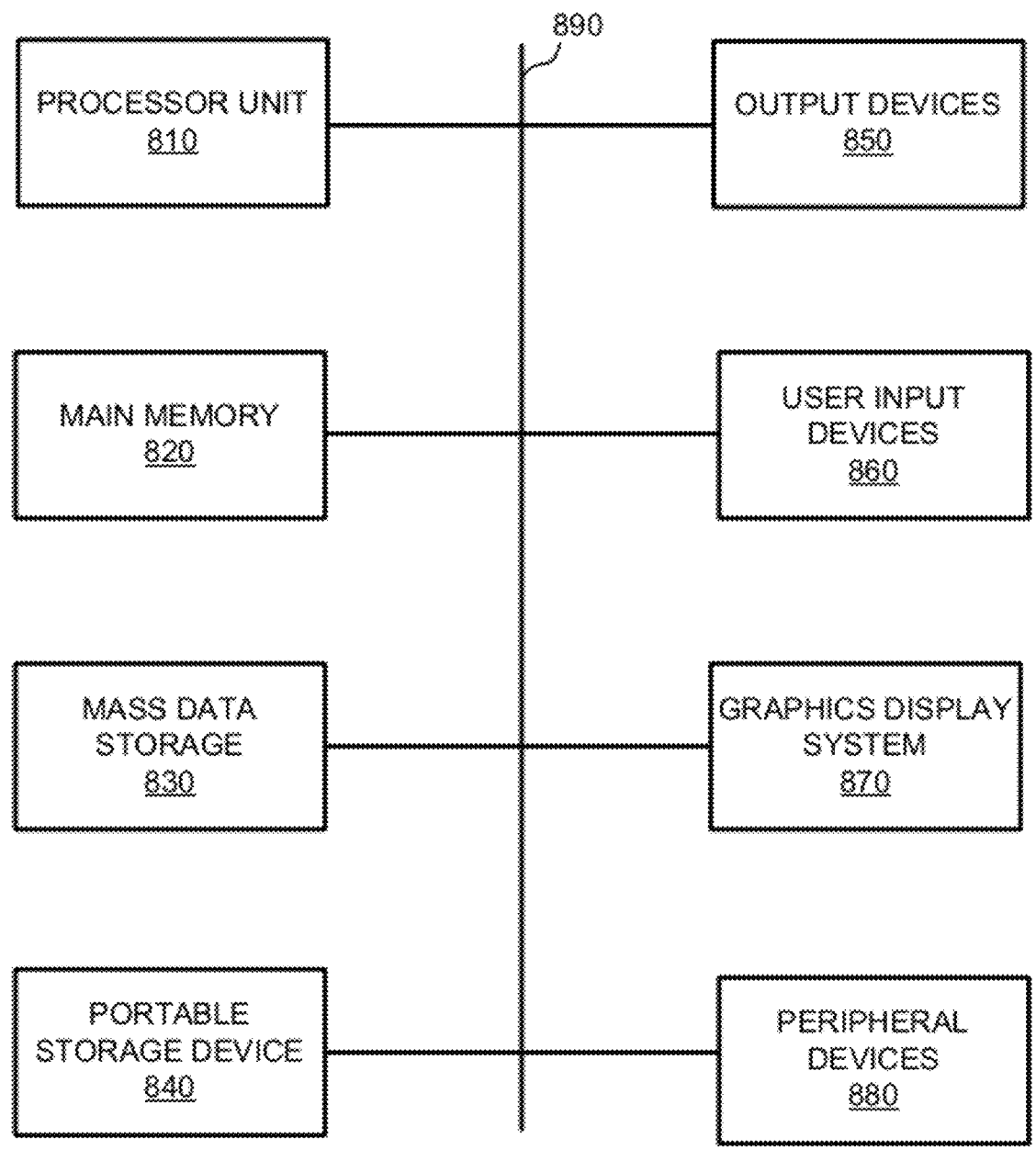
FIG. 8 is a block diagram of a computing system.

FIG. 8 illustrates an exemplary computing system 800 that may be used to implement, for example, accessory device 150. The system 800 of FIG. 8 may be implemented in the contexts of the likes of computing systems, networks, servers, or combinations thereof. The computing system 800 of FIG. 8 includes one or more processors 810 and main memory 820. Main memory 820 stores, in part, instructions and data for execution by processor 810. Main memory 820 may store the executable code when in operation. The system 800 of FIG. 8 further includes a mass storage device 830, portable storage device(s) 840, output devices 850, input devices 860, a graphics display system 870, and peripheral devices 880.

The components shown in FIG. 8 are depicted as being connected via a single bus 890. The components may be connected through one or more data transport means. Processor unit 810 and main memory 820 may be connected via a local microprocessor bus, and the mass storage device 830, peripheral device(s) 880, portable storage device 840, and display system 870 may be connected via one or more input/output (I/O) buses.

Mass storage device 830, which may be implemented with a magnetic disk drive or an optical disk drive, is a non-volatile storage device for storing data and instructions for use by processor unit 810. Mass storage device 830 may store the system software for implementing embodiments of the present invention for purposes of loading that software into main memory 820.

Portable storage device 840 operates in conjunction with a portable non-volatile storage medium, such as a floppy disk, compact disk, digital video disc, or USB storage device, to input and output data and code to and from the computer system 800 of FIG. 8. The system software for implementing embodiments of the present invention may be stored on such a portable medium and input to the computer system 800 via the portable storage device 840.

Input devices 860 provide a portion of a user interface. Input devices 860 may include an alphanumeric keypad, such as a keyboard, for inputting alpha-numeric and other information, or a pointing device, such as a mouse, a trackball, stylus, or cursor direction keys. Input devices 860 may also include a touchscreen. Additionally, the system 800 as shown in FIG. 8 includes output devices 850. Suitable output devices include speakers, printers, network interfaces, and monitors.

Display system 870 may include a liquid crystal display (LCD) or other suitable display device. Display system 870 receives textual and graphical information, and processes the information for output to the display device.

Peripheral devices 880 may include any type of computer support device to add additional functionality to the computer system. Peripheral device(s) 880 may include a GPS navigation device, (GSM) modem, satellite radio, router, and the like.

The components provided in the computer system 800 of FIG. 8 are those typically found in computer systems that may be suitable for use with embodiments of the present invention and are intended to represent a broad category of such computer components that are well known in the art. Thus, the computer system 800 of FIG. 8 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Mac OS, Palm OS, Android, iOS (known as iPhone OS before June 2010), QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), Blu-ray Disc (BD), any other optical storage medium, RAM, PROM, EPROM, EEPROM, FLASH memory, and/or any other memory chip, module, or cartridge.

While certain exemplary embodiments have been described and shown in the accompanying drawings, it is to be understood that such embodiments are merely illustrative and not restrictive of the broad disclosure and that this disclosure is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

In the foregoing specification, specific embodiments of the present disclosure have been described. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. A power adapter comprising:
   a first connector communicatively coupled with a plurality of conductors;
   a second connector communicatively coupled with two or more of the plurality of conductors; and
   a shunt communicatively coupled with at least four of the plurality of conductors and configured to provide power to an accessory output in response to an accessory connection being communicatively coupled with an accessory device, the shunt including:
      a protection circuit, the protection circuit configured to provide at least one of protection from overcurrents and protection from excessive transient voltages at a first, a second, a third, and a fourth inputs, the first, the second, the third, and the fourth inputs each communicatively coupled with the at least four conductors of the plurality of conductors;
      an inductive coupler including:
         a first transformer having a primary coil communicatively coupled with the first input and the second input, and
         a second transformer having a primary coil communicatively coupled with the third input and the fourth input;
      a main rectifier comprising:
         a first rectifier communicatively coupled with the first input, the second input, a first node, and a second node; and
         a second rectifier communicatively coupled with the third input, the fourth input, the first node, and the second node, and
      a failsafe including:
         a first output, the first output being communicatively coupled with a first conductor of the accessory output;
         a first switch communicatively coupled with the first node and the first output;
         a first power supply including a first secondary coil of the first transformer and a third rectifier, a first secondary coil of the second transformer and a fourth rectifier communicatively coupled with the first switch;
         a first opto-isolator communicatively coupled with the first output and the first switch;
         a second output, the second output communicatively coupled with a second conductor of the accessory output;
         a second switch communicatively coupled with the second node and the second output;
         a second power supply including a second secondary coil of the first transformer and a fifth rectifier, a second secondary coil of the second transformer and a sixth rectifier communicatively coupled with the second switch;
         a second opto-isolator communicatively coupled with the second output and the second switch;
         a loop input, the loop input communicatively coupled with a third conductor of the accessory output and the second opto-isolator, the second opto-isolator communicatively coupled with the first opto-isolator; and
         a loop output, the loop output communicatively coupled with the first opto-isolator, a third power supply, and a fourth conductor of the accessory output;
         the third power supply including a third secondary coil of the first transformer and a seventh rectifier, a third secondary coil of the second transformer and an eighth rectifier communicatively coupled with the loop output.

2. The power adapter of claim 1 wherein the protection circuit comprises at least one of a fuse, a circuit breaker, and a varistor.

3. The power adapter of claim 1, the shunt including an inductive coupler, the inductive coupler comprising:
   a first, second, third, and fourth inputs, the first, second, third, and fourth inputs each communicatively coupled with one of the at least four conductors of the plurality of conductors;
   a primary coil of the first transformer communicatively coupled with the first input and the second input; and
   a primary coil of the second transformer communicatively coupled with the third input and the fourth input.

4. The power adapter of claim 3 wherein the inductive coupler further includes a third transformer and a fourth transformer each configured to provide 1-500 Volts, the third transformer communicatively coupled with the first input, the second input, a first node, and a second node, and the fourth transformer communicatively coupled with the third input, the fourth input, third node, and a fourth node.

5. The power adapter of claim 3 wherein the shunt further includes a main rectifier, the main rectifier comprising:
a first rectifier communicatively coupled with the first input, the second input, a first node, and a second node; and
a second rectifier communicatively coupled with the third input, the fourth input, the first node, and the second node.

6. The power adapter of claim 5 wherein the first rectifier and the second rectifier each comprise at least one of a half-wave rectifier, a full-wave rectifier, and a filter.

7. The power adapter of claim 6 wherein the shunt includes a failsafe, the failsafe comprising:
a first output, the first output being communicatively coupled with a first conductor of the accessory output;
a first switch communicatively coupled with the first node and the first output;
a first power supply communicatively coupled with the first switch;
a first opto-isolator communicatively coupled with the first output and the first switch;
a second output, the second output communicatively coupled with a second conductor of the accessory output;
a second switch communicatively coupled with the second node and the second output;
a second power supply communicatively coupled with the second switch; and
a second opto-isolator communicatively coupled with the second output and the second switch;
a loop input, the loop input communicatively coupled with a third conductor of the accessory output and the second opto-isolator, the second opto-isolator communicatively coupled with the first opto-isolator; and
a loop output, the loop output communicatively coupled with the first opto-isolator, a third power supply, and a fourth conductor of the accessory output.

8. The power adapter of claim 7 wherein the first power supply includes a first secondary coil of the first transformer and a third rectifier, the second power supply includes a second secondary coil of the first transformer and a fourth rectifier, and the third power supply comprises a third secondary coil of the first transformer and a fifth rectifier.

9. The power adapter of claim 8 wherein the first power supply further includes a first secondary coil of the second transformer and sixth rectifier, the second power supply further includes a second secondary coil of the second transformer and a seventh rectifier, and the third power supply further includes a third secondary coil of the second transformer and an eighth rectifier.

10. The power adapter of claim 7 wherein the accessory output couples with the accessory device through an accessory connector.

11. The power adapter of claim 10 wherein the first connector, the second connector, and the accessory connector are plug-and-socket connectors.

12. The power adapter of claim 7 wherein the accessory output couples with the accessory device through two or more crimp connectors.

13. The power adapter of claim 7 wherein the plurality of conductors of the first connector include: a first alternating current input and a second alternating current input, the first alternating current input and the second alternating current input each being within a range of 360-460 Volts AC at 50 Hz or 400-500 Volts AC at 60 Hz.

14. The power adapter of claim 13 wherein the first, second, third, and fourth inputs are each communicatively coupled with one or more conductors of a plurality of conductors coupled with the first connector and the second connector.

15. The power adapter of claim 7 wherein the shunt further includes an enclosure, the enclosure configured to protect the power adapter from at least one of electrical shorts, shock, vibration, moisture, and corrosion.

16. The power adapter of claim 15 wherein the enclosure is comprised of at least one of thermo-setting plastic and silicone rubber gel.

17. The power adapter of claim 16 wherein the enclosure is comprised of at least one of thermoplastic elastomer, polyurethane, silicone, and epoxy resin.

18. The power adapter of claim 15 wherein the enclosure is configured for mounting inside a refrigerated container.

19. The power adapter of claim 18 wherein the enclosure is further configured for mounting on or adjacent to evaporator fan motors, in a compartment of the refrigerated container, or on or in the accessory device.

20. The power adapter of claim 19 wherein the accessory device is configured to provide ozone to the refrigerated container.

21. The power adapter of claim 19 wherein the accessory device is configured to perform at least one of: reduce oxygen concentration, increase carbon dioxide concentration, reduce ethylene concentration, control humidity, adjust a fresh air vent, filtration, control a state of the refrigerated container or a controller, log a state of the refrigerated container or the controller, and report a state of the refrigerated container or the controller.

22. The power adapter of claim 19 wherein the accessory device comprises at least one of a: membrane-based gas separation system, pressure-swing absorption device, compressor, condensation trap, chiller, evaporator, atomizer, air cleaner utilizing electrical fields, scrubber, and catalytic reactor.

23. A power adapter comprising:
a first connector communicatively coupled with a plurality of conductors;
a second connector communicatively coupled with two or more of the plurality of conductors; and
a shunt communicatively coupled with at least four of the plurality of conductors and configured to provide power to an accessory output in response to the accessory connection being communicatively coupled with an accessory device, the shunt including:
a protection circuit, the protection circuit configured to provide at least one of protection from overcurrents and protection from excessive transient voltages at a first, a second, a third, and a fourth inputs, the first, the second, the third, and the fourth inputs each communicatively coupled with the at least four conductors of the plurality of conductors,
an inductive coupler including:
a first transformer having a primary coil communicatively coupled with the first input and the second input, and
a second transformer having a primary coil communicatively coupled with the third input and the fourth input,
a main rectifier including:
a first rectifier communicatively coupled with the first input, the second input, a first node, and a second node; and a second rectifier communicatively coupled with the third input, the fourth input, the first node, and the second node, and a failsafe including:

a first output, the first output being communicatively coupled with a first conductor of the accessory output;

a first switch communicatively coupled with the first node and the first output;

a first power supply including a first secondary coil of the first transformer and a third rectifier, a first secondary coil of the second transformer and a fourth rectifier communicatively coupled with the first switch;

a first opto-isolator communicatively coupled with the first output and the first switch;

a second output, the second output communicatively coupled with a second conductor of the accessory output;

a second switch communicatively coupled with the second node and the second output;

a second power supply including a second secondary coil of the first transformer and a fifth rectifier, a second secondary coil of the second transformer and a sixth rectifier communicatively coupled with the second switch; and a second opto-isolator communicatively coupled with the second output and the second switch;

a loop input, the loop input communicatively coupled with a third conductor of the accessory output and the second opto-isolator, the second opto-isolator communicatively coupled with the first opto-isolator;

a loop output, the loop output communicatively coupled with the first opto-isolator, a third power supply, and a fourth conductor of the accessory output; and a third power supply including a third secondary coil of the first transformer and a seventh rectifier, a third secondary coil of the second transformer and an eighth rectifier communicatively coupled with the loop output.

24. The power adaptor of claim 23 further comprising a third transformer and a fourth transformer communicatively coupled with the first transformer and the second transformer and configured to step-up or step-down the voltage received from the first, second, third, and fourth inputs.

25. The power adaptor of claim 23 wherein the first connector and the second connector each comprise one or more crimp connectors communicatively coupled with the at least four of the plurality of conductors.

* * * * *